United States Patent
Costa et al.

(10) Patent No.: US 9,034,283 B2
(45) Date of Patent: May 19, 2015

(54) HYBRID PROCESS USING ION EXCHANGE RESINS IN THE SELECTIVE RECOVERY OF NICKEL AND COBALT FROM LEACHING EFFLUENTS

(75) Inventors: Renato de Souza Costa, Belo Horizonte (BR); Flávia Dutra Mendes, Belo Horizonte (BR)

(73) Assignee: VALE S.A., Rio de Janeiro (BR)

( * ) Notice: Subject to any disclaimer, the term of this patent is extended or adjusted under 35 U.S.C. 154(b) by 1107 days.

(21) Appl. No.: 12/184,951

(22) Filed: Aug. 1, 2008

(65) Prior Publication Data

US 2008/0289448 A1  Nov. 27, 2008

Related U.S. Application Data

(63) Continuation of application No. PCT/BR2007/000022, filed on Feb. 2, 2007.

(30) Foreign Application Priority Data

Feb. 2, 2006 (BR) ..................................... 0600901

(51) Int. Cl.
*C22B 3/00* (2006.01)
*B01J 39/04* (2006.01)
*B01J 45/00* (2006.01)
*B01J 47/02* (2006.01)
*C22B 3/42* (2006.01)

(52) U.S. Cl.
CPC .............. *C22B 23/043* (2013.01); *B01J 39/04* (2013.01); *B01J 45/00* (2013.01); *B01J 47/026* (2013.01); *C22B 3/42* (2013.01); *C22B 23/0453* (2013.01); *C22B 23/0461* (2013.01); *C22B 23/0476* (2013.01)

(58) Field of Classification Search
USPC .......................................................... 75/743
IPC ............................................. C22B 3/42,23/043
See application file for complete search history.

(56) References Cited

U.S. PATENT DOCUMENTS

| 3,661,564 A | 5/1972 | Gandon et al. |
| 3,839,168 A | 10/1974 | Gandon et al. |

(Continued)

FOREIGN PATENT DOCUMENTS

| JP | 57-019344 | 2/1982 |
| WO | WO 01/29276 | 4/2001 |

(Continued)

OTHER PUBLICATIONS

Zainol ("The Development of a Resin-in-pulp Process for the Recovery of Nickel and Cobalt from Laterite Leach Slurries", Murdoch University, Murdoch, Western Australia, Australia 6150, Ph.D. Thesis, 2005).*

*Primary Examiner* — Weiping Zhu
(74) *Attorney, Agent, or Firm* — Arent Fox LLP

(57) ABSTRACT

The present invention is directed to a hybrid process using ion exchange resins in the selective recovery of nickel and cobalt of leaching effluents that is comprised of the steps of processing (1) the laterite ore (M), which is then treated through leaching (2) (either atmospheric or under pressure), considering solutions from the solid-liquid separation step of existing plants already in operation (2) as well, in a way that the downstream process comprises an ion exchange hybrid circuit, wherein the first ion exchange step (3) with resins (Re) exhibits specific selectivity conditions for the removal of iron, aluminum and copper and an increased pH, and the second ion exchange step (4) allows the removal of nickel and cobalt.

16 Claims, 2 Drawing Sheets

(56) References Cited

U.S. PATENT DOCUMENTS 4,250,031 A 2/1981 Uejima et al.
2001/0001650 A1* 5/2001 Duyvesteyn et al. ......... 423/139

FOREIGN PATENT DOCUMENTS

| WO | WO 02/08477 | 1/2002 |
| WO | WO 2005/045078 | 5/2005 |

* cited by examiner

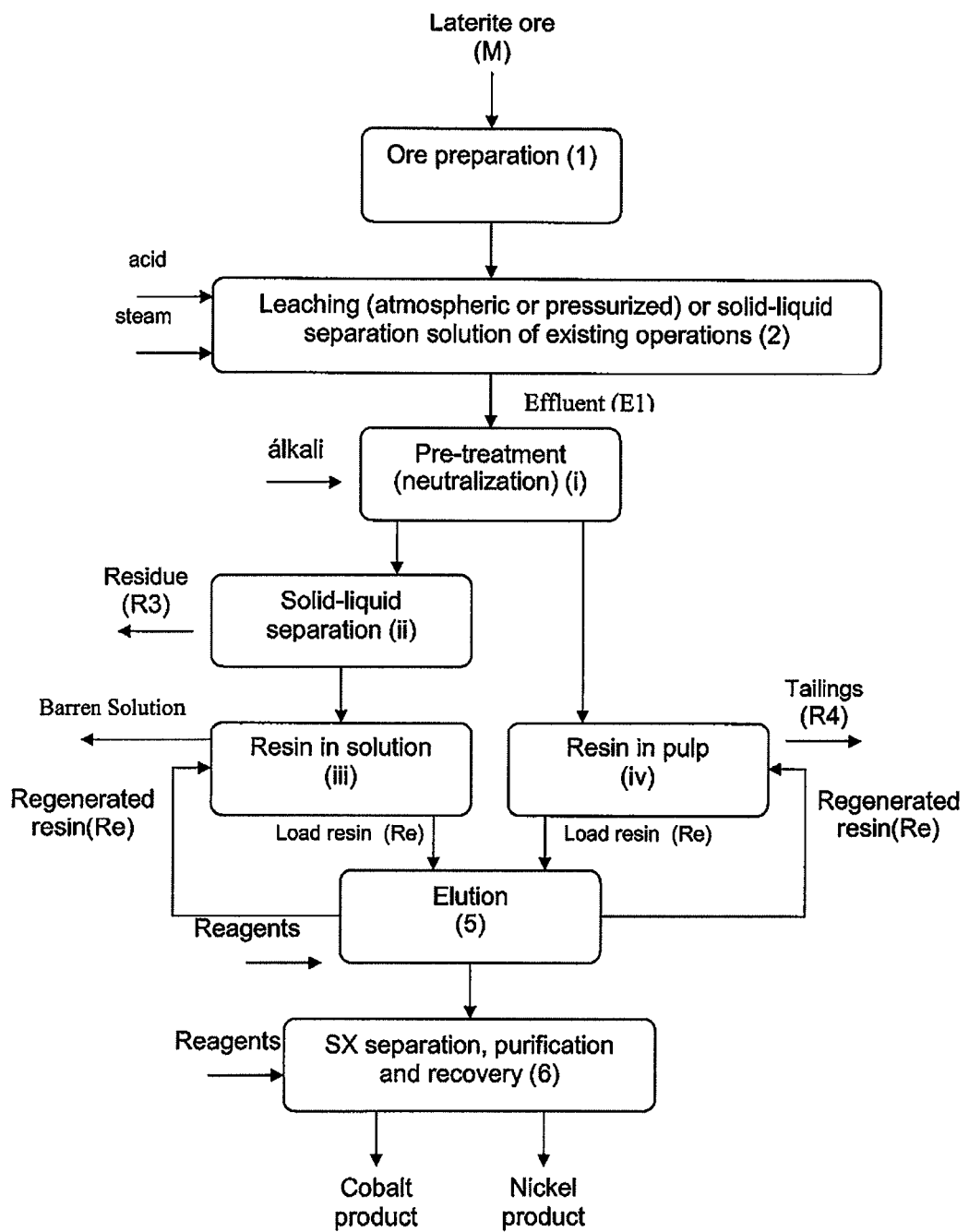
FIGURA 1

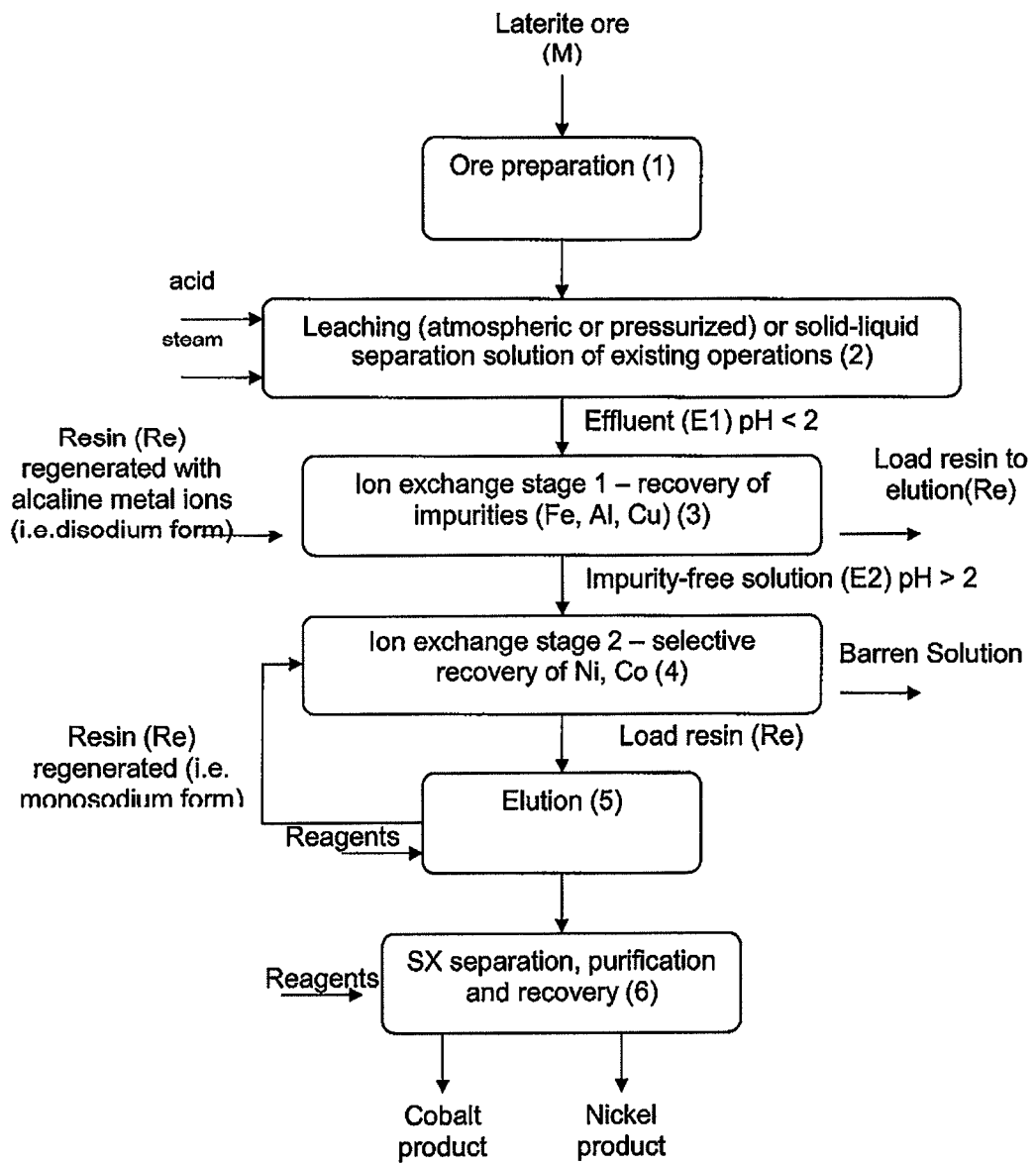
FIGURA 2

HYBRID PROCESS USING ION EXCHANGE RESINS IN THE SELECTIVE RECOVERY OF NICKEL AND COBALT FROM LEACHING EFFLUENTS

This application is a continuation of prior PCT application No. PCT/BR2007/000022 filed Feb. 2, 2007, which in turns claims priority to Brazilian Patent Application No. PI 0600901-8 filed Feb. 2, 2006.

DETAILED DESCRIPTION OF THE INVENTION

The present invention is directed to a hybrid process using ion exchange resins in the selective recovery of nickel and cobalt from leaching effluents, comprised of at least two resins steps, and more specifically to a hybrid loop of two resin steps, the first ion exchange step being the responsible for the removal of iron, aluminum and copper from the solution as well as the increase in the pH of the solution, and the second ion exchange step being the responsible for the removal of nickel and cobalt.

As is known by all those skilled in this art, several hydrometallurgical routes have been developed for the extraction of nickel and cobalt present in laterites ores.

The object of the routes is to solubilize the metallic species by using inorganic acid through leaching either in heap or tanks under conditions of atmospheric pressure and temperature below the boiling point or in pressurized vessels. The resulting solution is then subjected to a neutralizing step (removal of copper, iron, aluminum) and solid-liquid separation (optional), and at least a purification step of the solution and the final recovery in the metallic form or intermediate product.

The selective recovery of the metal present in the leaching effluent is an important step in the conception of the economic evaluation. The presence of many impurities, such as copper, iron, aluminum, manganese and magnesium, among others, can be considered as the main technological difficulty to be overcome.

One of the options may encompass the physical-chemical methods, such as the use of ion exchange materials, selective precipitation and the solvents extraction. In the specific case of nickel and cobalt, these metals have quite similar chemical properties, which facilitates the operations for the mutual recovery of such metals, either through precipitation in the form of mixed sulfides or mixed hydroxides, or the extraction using solvents in a chloridric medium, or finally the application of polymeric resin type ion exchangers.

The ion exchange can be defined as a reversible ion exchange between a solid and an aqueous electrolyte, in such a way that there is no significant change in the structure of the solid. In this case, the solid is the ion exchange material that can either have an inorganic nature, for example, zeolites, or an organic nature, that includes the materials based on synthetic polymeric resins. The matrix of a resin is composed of a high molecular weight, insoluble, irregular, macromolecular, three-dimensional and elastic hydrocarbon chain that derives from the copolymerization of styrene and divinyl benzene. In the matrix, positive or negative functional groups are tightly linked (fixed ions), which are compensated for by opposite charge ions (opposite ions). These are free to move inside the matrix and can be stoichiometrically substituted by others ions of the same charge. By contrast, the socalled co-ions are all the ionic species that can be present in the ion exchanger and exhibit the same charge as that of the fixed ions. The main types of resins that are commercially used include cationic resins that, depending on the degree of acidity of the functional group, can be of weak or strong acids, and anionic resins that, depending on the basicity degree, can be of strong or weak bases, in addition to chelating resins. Certain materials that are called amphoteric are capable to carry out both cation and anion exchange.

The chelating resins had been developed for selectively recovering transition metals in solution, such as nickel and cobalt, since they form highly stable chelating complexes or metallic heterocyclic chelates with such cations. The chelates can be defined as any compound in which a ring is formed, resulting from a coordinate linkage between two or more small sites of a molecule and a metallic ion.

The chelating resins can be considered as the representatives of the group of ion exchange polymeric resins for hydrometallurgical application that are, indicated for the selective removal of heavy metals, such as nickel and cobalt, from acidic aqueous solutions. These exchangers are copolymers having functional groups that are covalently linked and contain one or a number of donating atoms (Lewis base) that can form coordinate links with most polyvalent cations of heavy metals (Lewis acid). Usually, the functional groups in chelating resins contain atoms such as nitrogen, oxygen, phosphorus and sulfur. The examples of chelating functional groups include amidoxime, aminophosphonate, carbamates, poliamines, pyridines, iminodiacetate and picolilamine. Coulombic and hydrophobic interactions are present too; however, the contribution to the high selectivity of metallic ions is relatively small when compared to the Lewis acid-base interactions. These resins can normally be regenerated with acidic solutions (sulfuric or hydrochloric acid), thus attaining high efficiency.

The ion exchange resin is deemed to be a technological option for the purification/recovery of metals in an aqueous medium. This technique is part of hydrometallurgical flowsheets of nickel laterite ores that necessarily require a leaching step, as a way to extract the metal from the ore. The resin technology can be applied to the existing plants where countercurrent decantation processes (CCD) are employed, and it also can be directly applied to the effluent of the leaching when the project is being developed, for the purpose of reducing costs and impact on the environment.

The leaching can be carried out using acidic or basic leaching agents either in heaps or tanks under atmospheric conditions, or in pressurized vessels. Once the metal is extracted from the ore and solubilized in an aqueous solution, the ion exchange technique using resins, preferential of the chelating type, can be applied to the effluent in the form of a pulp or solution, for the recovery of nickel and cobalt.

The application of the ion exchange technique using polymeric resins for the selective adsorption of nickel can take place in two ways, that is, either for the resin in a solution or for the resin in a pulp.

In the first type of operation, a solution having metals dissolved therein is percolated, for instance, through a fixed bed of resin so that the adsorption can take place, whereas in as the second type of operation an ore pulp is directly contacted with the resin, through an agitation system, so that the adsorption of the metal can take place without the need of an expensive step for the solid-liquid separation of the pulp. After the contact, the separation between the resin and the pulp is carried out through screening.

In nickel laterite ore processing flowsheets, any of the two options can be adopted. For the application of the resin in solution, a previous solid-liquid separation step is required. In this step, in addition to a significant operational and capital cost, it is observed the occupation of large areas and significant amounts of water consumed, also there is a loss of nickel inherent to the inefficiency of the process, due to difficulty of washing the solids and recovering the dissolved species. For this reason, the application of the process using the resin in a pulp is in many cases suggested, since it is the recovery of the metal dissolved in the pulp itself after the leaching, using an ion exchanger and thus not requiring the solid-liquid separation.

If the process using the resin in a pulp is used in the recovery of the nickel from the acidic leaching, the following benefits can be provided: 1) the use of conventional resins, that also are selective for the iron, requires a previous neutralization before the nickel is recovered. The ferric hydroxide precipitates easily through the addition of lime or limestone and becomes part of the pulp. 2) The neutralization of the acidity of the pulp is conveniently carried out in the adsorption step itself during the contact. Reagents such as lime or limestone could be used and the slurry formed during the neutralization would become part of the pulp. 3) The acidic leaching, followed by a neutralization, can produce either a pulp that is difficult to settle or solids that, when are separated, are difficult to wash. The process using the resin in a pulp can overcome such operational difficulties through the elimination of the solid-liquid separation step. 4) In this process, the sorption-leaching phenomenon takes place, since during the contact, a portion of the nickel precipitated in the neutralization is re-leached and, when it is sent back to the solution, it is immediately adsorbed by the resin. Thus, the application of resin in a pulp results in the minimization of such losses, recovering about 20% of the nickel that was initially co-precipitated.

The ion exchange is a technology that has been improved with several approaches and quite promising results. The use of the ion exchange technique using polymeric resins, while providing a new industrial application in nickel ore flowsheets, offers a number of advantages, such as the absence of reagents losses as is common in extraction processes using solvents, the efficient recovery and removal of small concentrations of some metallic ions relative to an excess of other metals, high selectivity for metals of interest, higher capacity of separation, flexible regimes of processes, simple configuration of process, product with high purity—high concentration of the metal of interest relative to the other impurities, and high level of automation. Such characteristics result in a lower operational and capital cost and, in addition to a lower impact on the environment, since there is a lower consumption of water and it is possible to recycle the water.

Despite all the advantages disclosed herein-above, the application of conventional resins that are commercially available for the selective nickel recovery in laterite processing is a new industrial technology that still exhibits a number of restrictions and operational difficulties.

One of the shortcomings that can be mentioned herein is that as a function of the high selectivity to hydrogen ions, the pH of the solution should be increased to values higher than pH=3.0. Only in this way the conventional resins can be selective to nickel and exhibit a high performance of adsorption for this metal. Otherwise, in the presence of an excess of hydrogen ions (low pH), they preferably will be adsorbed, thus hampering the nickel adsorption process.

Another notable shortcoming is that the whole solution resulting from the acid leaching of nickel ore has many metals dissolved therein, in addition to nickel and cobalt, that are referred to as impurities. Since most of the resins that are selective for nickel, also are selective for iron, copper and aluminum, a previous step to treat the solution in order to eliminate such impurities is then required.

At present, there are techniques that have been implemented in an effort to solve such problems, such as the addition of a neutralization step, right after the leaching, with the addition of lime, limestone, soda or ammonia, for precipitating the impurities and increasing the pH simultaneously.

Although it is very efficient for correcting the technical limitations, such as the excess of acidity of the solution and the presence of impurities in solution, the neutralization presents the inconvenience of a significant loss of nickel that is co-precipitated with the impurities.

Another inconvenience observed in this neutralization process is the need of an expensive solid-liquid separation step, in case of the resin in solution application has been selected.

In both cases, the resin in solution or the resin in pulp, a previous step to neutralize the acidity is needed in fact, for increasing the pH and eliminating the impurities through precipitation, as shown in the flowsheet of the process in FIG. 1. This neutralization step is necessary in the process, however it exhibits the great disadvantages already cited, such as losses of the nickel co-precipitated together with impurities and also the need of a solid-liquid separation step, in the event it is chosen the use of resin in solution.

It is essential to mention that the application of the resin in pulp, though exhibits all the advantages already mentioned, still has some limitations and technical risks, such as the lack of a resin that exhibits high mechanical and abrasive resistance in the market to be contacted to a pulp. For this reason, many times the application of the resin in solution is deemed to be the best option, and thus it can be seen that the ore should be subjected to a pre-treatment with the disadvantages of a loss of nickel in the precipitate, followed by the expensive solid-liquid separation step.

This problem is significantly aggravated when the leaching is carried out in heaps. The effluent of this operation, in the form of a solution, is already ready to be fed into the step of resin in solution. It is a solid free effluent, in the form of a clarified solution and, therefore, suitable to be fed into a fixed resin bed, for example, in a column. The need of a previous pre-treatment step generates a number of complications, such as the formation of a pulp, with losses of the nickel contained in the precipitate, that should then be subjected to the solid-liquid separation, and then the clarified solution is fed into the ion exchange column.

An object of the present invention is, therefore, to provide a hybrid process using an ion exchange resin that eliminate the neutralization step (pre-treatment) of the solution.

Another object of the present invention is to provide a hybrid process using ion exchange resins that make it possible to purify the effluents of the leaching in a cost-efficient way.

Another object of the present invention is to provide a hybrid process using an ion exchange resin that prevents the losses of nickel in the precipitate through co-precipitation.

Another object of the present invention is to provide a hybrid process using an ion exchange resin that prevents the solid-liquid separation of the pulp generated therein.

These and other objects and advantages of the present invention are attained through a hybrid process that uses an ion exchange resin that comprises the inclusion of a first cationic resin circuit, whose mobile ions are preferably alkali metals, in order to provide a simultaneous increase in the pH solution besides impurities adsorption. The hybrid ion exchange process is comprised of a first ion exchange step using resins under specific conditions of selectivity for the removal of iron, aluminum and copper and increase of the pH, and a second ion exchange step, preferably with resins of the iminodiacetic group that makes it possible to remove nickel and cobalt.

The present invention will be described below with reference to the accompanying drawings, wherein:

FIG. 1 represents a flowsheet of the conventional process for the extraction of nickel in laterites ores; and FIG. 2 represents a flowsheet of the hybrid process that applies two circuits of ion exchange resins for the selective recovery of impurities in a first stage and selective recovery of nickel and cobalt from the effluents of leaching in a second stage.

It should be pointed out that a resin (picolilamine group) which is capable of adsorbing nickel under extremely acidic conditions and in the presence of high concentrations of impurities can be found in the market, however its cost is extremely high for most of the nickel projects. For said resin, all the procedure that is proposed and suggested in this text does not apply, since a pre-treatment is not required, nor even the elimination of impurities, nor even the increase in the pH, and therefore there are no inconveniences resulting from said step.

In accordance with these figures, the solution that has been proposed is the elimination of the step of pre-treatment (neutralization) of the pulp for the purpose of increasing the pH and precipitating the impurities such as iron, aluminum and copper, thus preventing the losses of nickel in the precipitate through co-precipitation and the need of solid-liquid separation of the pulp generated therein.

The proposal comprises the operation of a two-step hybrid circuit using ion exchange resins that can include the same resin or different resins, that can be of different types, different functional groups and different manufacturers. The two steps using ion exchange resins would be applied to the solution coming from the solid-liquid separation step of existing plants or to the effluent from the leaching step of projects that have been developed, that contains dissolved metals, including high concentrations of iron, aluminum, manganese and magnesium, in addition to nickel, cobalt and copper.

As can be seen in the flowsheet shown in FIG. 2, the start of the hybrid process that uses ion exchange resins is similar to the conventional ones, that is, the laterite ore (M) is processed (1). After being processed (1), the ore (M) will be treated through leaching (2) (atmospheric or under pressure or combination of both) or also a solution coming from the solid-liquid separation step of existing plants already in operation (2) can be considered.

The effluent (E1) from such a treatment is expected to be acidic (pH<2) and should not be submitted to the pre-treatment step (i) as it occurs in the conventional procedures. The first step (3) of the cationic ion exchange hybrid circuit, whose mobile ions are necessarily alkali metals in a disodium form conditioning, should provide an increase of pH. The object in this step is to eliminate the impurities, such as iron, copper and aluminum, then the resins (Re) should exhibit a preferential adsorption for iron, copper and aluminum under high acidity conditions, such as those attained in the effluents of the leaching (2) of nickel ores (M).

The object of the first ion exchange step (3) is to recover iron, copper and aluminum, and reject nickel and cobalt. In order that it can effectively take place, the pH of the solution/pulp that feeds this step should be low (lower than pH=2.5), similar to the acidic conditions of the effluent (E1) of the leachings (2) of laterite ores (M). Under such conditions and through the use of a suitable cationic or chelating resin, the impurities (iron, copper and aluminum) should be adsorbed in the resin (Re) and thus recovered, at the same time the nickel and cobalt are rejected, and will remain in the solution. The use of a resin (Re) regenerated with alkali metal ions in a disodium form for example, is basically important, since these mobile ions will be changed by $Fe^{3+}$, $Al^{3+}$ and $Cu^{2+}$ ions, and then the alkali metal ions, consequently going back to the solution and increasing the pH. The role of the basic nature of the alkali metals ions present in the solution is to increase the pH of the solution, so that the solution can be fed into the second step of ion exchange resins with a higher pH.

The second step (4) of resins, in series with the first step, and that will be fed with the effluent (E2) from the first step (3), is used in order to recover nickel and cobalt from the solution, under milder acidic conditions and without the interference of impurities. So that this can effectively take place, the pH of the solution should be higher than 1, preferable as close to 4.0 as possible, that will be attained by the alkali metal ions displaced to the solution during the exchange recovery of the first step. If required, a reagent of a basic nature for increasing the pH can be used, in an intermediate step between steps 1 and 2. Under such conditions of the second step, the chelating resin (Re), preferably with an iminodiacetic acid functional group, that is deemed to be an attractive resin in terms of costs, still exhibits a high selectivity for iron, aluminum and copper. Since such impurities have already been eliminated from the solution in the previous step, the resin (Re) of the second step (4) is then under better conditions for the efficient and selective recovery of nickel and cobalt.

The operational conditions of the two steps should be different, such as, for example, the conditions of the pH of the medium, the size of the equipment, the residence time and the operational capability. The steps may exhibit the same resin (Re) common to both, or also the option of applying two distinct resins (Re) according to the needs of the effluent to be treated. If it is chosen to use of the same resin (Re), this will be a perfectly viable alternative and therefore the most recommended one.

After the second step (4), the process follows the same steps of a conventional process, thus, the resin (Re), that is charged with cobalt and nickel ions, will be subjected to an elution process (5), that is, the resin (Re) will be contacted with eluents, such as hydrochloric or sulfuric acid or any ammonium salt, thus separating the metals from the resin (Re) that will be regenerated and sent back to the circuit in the second step (4). After the elution (5), if required, the nickel and cobalt separation is carried out through the solvent extraction (6) and the recovered metals could be in the metallic form or any other mixed form.

Thus, the hybrid process using ion exchange resins makes it possible to purify the effluent, in the form of a pulp or solution, generated in the several forms of leaching of nickel ores (M) in general.

Although a preferred concept of this solution has been described and illustrated, it should be pointed out that other solutions can be attained without departing from the scope of the present invention.

The invention claimed is:

1. A hybrid process using ion exchange resins in selective recovery of nickel and cobalt from leaching effluents comprising processing laterite ore being later treated for leaching, said hybrid process including a cationic or chelating resin hybrid circuit consisting of:
   a first step of ion exchange with the resins fed with a first effluent having a pH value of no more than 1 comprising impurities including iron, aluminum and copper, the resins exhibiting specific selectivity conditions for absorbing iron, aluminum and copper and neutralizing the pH while rejecting nickel and cobalt so that the pH of the effluent from the first step is raised to a value higher than 1, a second step of ion exchange, in series with the first step of ion exchange with the resins fed, with effluent of the first step, the resins of the second step absorbing nickel and cobalt; and eluting the resins of the second step having absorbed nickel and cobalt ions to form an eluate comprising nickel and cobalt; and separating the nickel and cobalt in the eluate through solvent extraction and recovering metals in solution, wherein the leaching is one of atmospheric leaching or pressure leaching.

2. The hybrid process according to claim 1, wherein a neutralization of the leached ore is eliminated.

3. The hybrid process according to claim 1 or claim 2, wherein the first effluent that feeds the first step is acidic, the resins, under the conditions of the first step, adsorbs iron, copper and aluminum under highly acidic conditions, contains mobile alkali metal ions that are exchanged by $Fe^{3+}$, $Al^{3+}$ and $Cu^{2+}$ ions, and increases the pH.

4. The hybrid process according to claim 3, wherein an intermediate neutralization step with a strong basic reagent takes place between the first and second ion exchange steps, and the pH of the effluent that feeds the second step of adsorption of nickel and cobalt is increased.

5. The hybrid process according to claim 4, wherein, in the second step, the resins contains a functional group comprising an iminodiacetic group, and nickel and cobalt are selectively recovered when the second step is complete.

6. The hybrid process according to claim 1, wherein the eluting step includes regenerating the eluted resins with inorganic solutions and returning the regenerated resins to the second step.

7. The method of claim 1, wherein the laterite ore is treated in existing plants.

8. The hybrid process according to claim 1, wherein the resins of the first step comprise cationic resins and wherein the resins of the second step comprise chelating resins.

9. The hybrid processing according to claim 1, wherein the resins of the first step comprise cationic resins whose mobile ions are alkali metals in a disodium form conditioning.

10. The hybrid processing according to claim 9, wherein the cationic resins are adapted to eliminate iron, copper and aluminum.

11. The hybrid processing according to claim 1, wherein the resins of the second step comprise chelating resins.

12. The hybrid processing according to claim 11, wherein the resins of the first step are adapted to eliminate iron, copper and aluminum and wherein the chelating resins are adapted to recover the nickel and cobalt from the effluent of the first step at a pH greater than 1.

13. The hybrid processing according to claim 11, wherein the chelating resins comprise an iminodiacetic acid functional group.

14. The hybrid processing according to claim 1, wherein the resins of the first circuit are the same type as the resins in the second circuit.

15. The hybrid processing according to claim 1, wherein the step of eluting includes eluting the resins of the second step with one of hydrochloric acid, sulfuric acid, and an ammonium salt to separate the nickel and cobalt from the resins of the second step.

16. The hybrid processing according to claim 1, wherein the eluting step includes regenerating the eluted resins and returning the regenerated resins to the second step.

* * * * *